United States Patent [19]

Sauder et al.

[11] 3,993,237

[45] Nov. 23, 1976

[54] METHOD FOR PROVIDING HIGH-TEMPERATURE INTERNAL INSULATION

[75] Inventors: Robert A. Sauder; Gary R. Kendrick; John R. Mase, all of Emporia, Kans.

[73] Assignee: Sauder Industries, Inc., Emporia, Kans.

[22] Filed: July 14, 1975

[21] Appl. No.: 595,738

Related U.S. Application Data

[60] Continuation of Ser. No. 445,807, Feb. 25, 1974, abandoned, which is a division of Ser. No. 157,433, June 28, 1971, Pat. No. 3,819,468.

[52] U.S. Cl. .................................. 228/140; 29/526; 29/469; 52/745; 52/747; 156/62.8; 156/71; 219/94; 219/99; 264/30; 428/119

[51] Int. Cl.[2] .......................................... B23P 21/00

[58] Field of Search ........... 156/62.2, 71, 279, 62.8; 29/455, 469, 526; 52/745, 747; 264/30; 219/98, 94, 99; 428/119; 228/182, 140

[56] References Cited

UNITED STATES PATENTS

| | | | |
|---|---|---|---|
| 3,012,923 | 12/1961 | Slayter | 156/164 |
| 3,118,807 | 1/1964 | Holcomb | 428/281 |
| 3,449,084 | 6/1969 | Smoot et al. | 264/30 |
| 3,587,198 | 6/1971 | Hensel | 264/30 |
| 3,594,147 | 7/1971 | Galey et al. | 264/30 |

*Primary Examiner*—Edward G. Whitby
*Attorney, Agent, or Firm*—Arnold, White & Durkee

[57] ABSTRACT

A ceramic fiber mat attached to the interior wall or surface of a high temperature chamber of furnace or adapted to overlie an intermediate insulating member positioned between the mat and a furnace wall, the fibers in the mat lying in planes generally perpendicular to the wall, the mat constituting an improved insulation for the wall where the interior of the chamber or furnace will be operating at temperatures in excess of 1600° F.

9 Claims, 15 Drawing Figures

METHOD FOR PROVIDING HIGH-TEMPERATURE INTERNAL INSULATION

This is a continuation of a divisional application, Ser. No. 445,807, filed Feb. 25, 1974 now abandoned, divided from parent application Ser. No. 157,433, filed June 28, 1971, now U.S. Pat. No. 3,819,468.

CROSS-REFERENCE TO RELATED APPLICATIONS

This application briefly describes, but does not claim, a method and apparaus for welding which is more fully described and claimed in U.S. Pat. No. 3,796,870, issued Dec. 19, 1972 in the names of the inventors Robert A. Sauder and Gary B. Kendrick and entitled "Method and Apparatus for Stud Welding." In addition, the subject matter of this application is related to copending U.S. patent application Ser. No. 507,484 filed Sept. 19, 1974, now U.S. Pat. No. 3,940,244 in the names of Robert A. Sauder, Gary R. Kendrick and Dale Rich and entitled "Ceramic Fiber Insulation Module."

FIELD OF THE INVENTION

The present invention relates to a method and apparaus for insulating the interior of a high temperaure furnace and more paticularly to a ceramic fiber mat constituting the hot face of the insulation and wherein substantially all of the fibers in the fiber mat lie in planes which are generally perpendicular to the various walls of the furnace.

THE PRIOR ART

The problems involved in insulating the interior of a high temperature furnace or, stated differently, the walls and ceiling of such a furnace are well known. Historically, the interiors of high temperaure furnaces have been lined with various types of bricks capable. of withstanding these high temperatures. When the brick lining wears out, however, it is an arduous and time-consuming task to replace the old brick with a new brick lining. On the other hand, efforts have been made to insulate the interior of a furnace where the interior or hot face of the insulation includes or consists of ceramic fiber material. Ceramic fiber material, as referred to herein, is generally available in the form of a ceramic fiber blanket which is customarily manufactured in a manner similar to the conventional paper-making process. As such, the fibers which constitute the blanket, (as is also the case in connction with paper) are oriented in planes which are generally parallel to the longitudinal direction of formation of the blanket or sheet. When, as proposed in the past, lengths of ceramic fiber blanket are placed against a furnace wall or overlying an intermediate insulating member which, in turn, would be attached to the furnace wall, the fibers will then be lying in planes generally parallel to the furnace wall. Also, it is believed that a majority of these fibers will be lying in a direction which would tend to be colinear with the direction of formation of the blanket itself, although a considerable number of fibers are still in a more or less random disposition in these planes. Nevertheless, where the fibers are disposed in planes which are parallel to the furnace wall, there is a tendency for the fiber blanket material to produce cracks which result from heat shrinkage.

With certain types of insulation it is recognized that high temperature problems sometimes involve melting, oxidation and other types of deterioration of the insulating medium. As far as ceramic fiber insulation is concerned, the high temperature problems are generally cracking, delamination (peeling off of the surface layers), and devitrification, all of which are believed to be interrelated. At the lower temperatures of the recommended range of the present invention, namely, 1600° to 2800° F, devitrification will take place relatively slowly, whereas at the higher end of the range, devitrification will take place quite rapidly, followed, in short order, by cracking and/or delamination.

In retrospect, the prior art broadly discloses the feature of re-orienting fiber insulation, but only in connection with low temperature insulation. For example, Di Maio et al. Pat. No. 2,949,593 and Slayter Pat. No. 3,012,923 both show the cutting of strips of fibrous material from a sheet or mat of the same, arranging the strips in a side-by-side relation to provide an end fiber exposure, compressing the strips and, while still compressed, applying an adhesive backing sheet of paper or cloth to one side edge only of the resulting compressed block; thereafter when the forces of compression are removed the resulting block will tend to curl around the adhesive sheet so as to form a suitable insulating body for pipe or the like. However, the resulting insulaion is necessarily low-temperature insulation because the pipe is in direct contact with the heating or cooling medium which it carries; the insulation is used on the external surface of the body or pipe to be insulated; the sole purpose in arranging the strips in an end or edgewise exposure of the fibers is to permit compression of the strips so that, after one side edge is secured in place by means of the backing strip, advantage can be taken of the relatively greater expansibility along the unsecured edge.

SUMMARY OF THE INVENTION

In a preferred embodiment of the invention there is provided a method of providing internal insulation for a furnace wall comprising attaching to the furnace wall side-by-side strips of material composed of insulating fibers, the fibers forming a plurality of planes, these planes being substantially parallel to each other and generally perpendicular to the furnace wall.

In further embodiments of the invention, the method comprises constructing a plurality of insulating blocks, with each of the blocks having a flat side adapted for attachment to the inside wall of a furnace and being comprised of side-by-side strips of material composed of insulating fibers, the fibers forming a plurality of planes substantially parallel to each other and generally perpendicular to the flat side of the blocks. Each of these blocks is then attached to the furnace wall.

In more specific embodiments of the invention the insulating fibers are ceramic fibers and are randomly oriented in planes which are substantially parallel to each other and perpendicular to the furnace wall.

In still other embodiments of the invention, the method comprises attaching a mat of insulating fibers to a furnace wall by means of an intermediate member positioned between the mat and the furnace surface. The term "wall" should be construed as covering any side wall or ceiling, removable or fixed, the area surrounding any access opening and any other surface on the interior of the high-temperature chamber where insulation is required or desired. The term "furnace" should be construed as covering any high-temperature chamber, oven, heater, kiln or duct with the understanding that the insulation is always internal and always "high-temperature", namely capable of operating at temperatures in excess of 1600° F.

The ceramic fiber mat is preferably made up of strips which are cut transversely from a length of ceramic fiber blanketing which is commercially available. The strips are cut from the fiber blanket in widths that represent the linear distance from the cold face to the hot face of the insulating fiber mat. The strips which are cut from the blanket are placed on edge and laid lengthwise adjacent each other with a sufficient number of strips being employed to provide a mat of the desired width. Naturally, the thickness of the fiber blanket from which the strips are cut will determine the number of strips required to construct the mat. The strips can be fastened together by wires, or by ceramic cement or mortar which is preferably employed in the region of the cold fact of the mat. The mat can be applied to the furnace wall or to an intermediate member by means of a stud welding method or by ceramic cement, mortar, or the like.

As disclosed herein, the present invention has particular application for the internal insulation of furnace walls of high temperature furnaces. For the purposes of the present invention, "high temperature" will mean temperatures in excess of 1600° F and, preferably, in the range of 1600° F to 2800° F. The ceramic fiber strips referred to herein are cut from a ceramic fiber blanket which is commercially available from several different manufacturers; these blankets are manufactured under the trademarks or tradenames "Kaowool" (Babcock & Wilcox), "Fibre-Frax" (Carborundum Co.), "Lo-Con" (Caborundum Co.), and "Cero-Felt" (Johns Manville Corp.). Most of these ceramic fiber blankets have an indicated maximum operating temperature of about 2300° F. The end or edge fiber exposure provided by the present invention not only provides an improved insulation up to the maximum indicated operating temperature suggested by the manufacturers, but because devitrification and its deleterious effects are largely eliminated, also permits operation up to about 2800° F.

By arranging the fibers in an end or edgewise exposure; that is, where the fibers are oriented in planes generally perpendicular to the wall of the furnace, devitrification is not necessarily avoided but its undesirable side effects are minimized or eliminated because devitrification takes place at the ends of fibers rather than along the lengths thereof; thus cracking and delamination are essentially avoided by the present invention even up to a temperature of 2800° F which is above the recommended maximum temperature specifications imposed upon the fiber blankets by the manufacturers.

The present invention also provides an insulation which will maintain the outside (cold face) of the furnace within an acceptable range. It is recognized that the minimum external temperaure will be dependent upon a number of different factors including, but not limited to, the type, thickness and strength of the outside furnace wall; ambient temperature conditions outside the furnace wall. The use of the present invention, however, will provide an outside temperature varying between 200° and 350° F which is considered to be an acceptable range, the temperature being measured in still air at 83° F.

Another advantage which accrues from the use of the fiber blanket (or strips thereof) in the end or edge exposure of the fibers is that the resulting mat has a certain resiliency in a direction parallel to the insulated face. Thus, where metallic fasteners are employed to attach the mat or composite block to the interior wall of the furnace or oven by "burying" or imbedding the fastener in the insulating member, this natural resiliency of the material will tend to keep the ends of the fastening elements completely covered at all times; this is true even if a tool is inserted in or through the fiber material to engage the metallic fastener for turning or welding purposes; after the tool has been withdrawn the natural resiliency of the fibrous material, as presently oriented, will cause the material to spring back and completely cover the outer end of the metallic fastening member.

DESCRIPTION OF THE PREFERRED EMBODIMENTS

Figure 1:
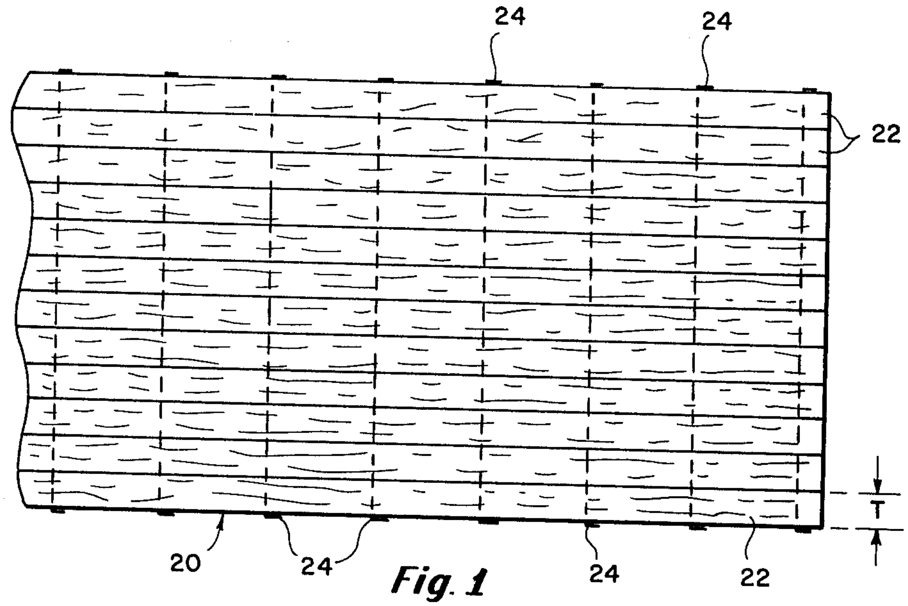
FIG. 1 is a fragmentary plan view of an insulating mat made from strips of ceramic fiber blanket.

Referring to the drawings in detail, FIG. 1 shows a portion of the outer surface (hot face) of an insulating mat, generally designated by the reference character 20, composed of a plurality of strips 22 which are cut transversely from a ceramic fiber blanket (not shown). As indicated heretofore, these ceramic fiber blankets are generally provided in widths of several feet, of thicknesses generally ranging from one-sixteenth of an inch to three inches and of almost any desired length; the manufacturer generally rolls up the blankets lengthwise so that, when supplied, these blankets are in the form of rolls whose diameter are dependent upon the length of material in the roll. When the strips 22 are cut from the fiber blanket they are cut in a direction of the thickness perpendicular to the width and length so that the lowermost strip 22 shown in FIG. 1 has a dimension T which represents the thickness of the fiber blanket from which the strips 22 are cut.

The strips 22, after they are cut from the fiber blanket, are placed on edge adjacent each other until the desired width of mat is obtained as shown in FIG. 1. Obviously, the number of strips required will depend upon the thickness T of the fiber blanket from which the strips are cut. If a fiber blanket could be provided of thickness twice that of T, then only one half of the number of strips shown in FIG. 1 would be required. Furthermore, if it were possible to provide a fiber blanket having a thickness equal to the width of the resulting block or mat therefor, then only one such strip would be employed in connection with each insulating block.

Figure 2:
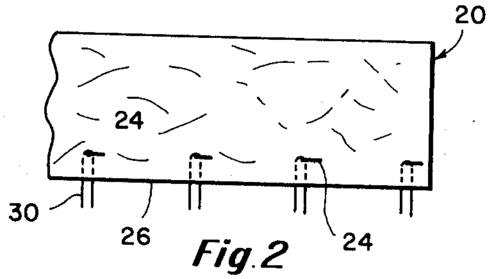
FIG. 2 is a fragmentary side elevation of the ceramic fiber mat shown in FIG. 1.
Figure 3:
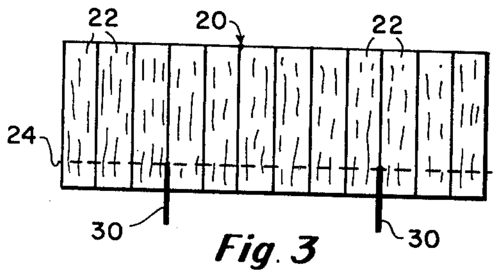
FIG. 3 is an end elevation of the ceramic fiber mat shown in FIG. 1.

The strips 22 are held together by any convenient means; as best shown in FIGS. 1 to 3, the strips 22 are held together by means of a plurality of stainless steel wires 24 which run transverse to the strips approximately one-half inch from and parallel to the cold face 26 of the mat. The ends of the wires 24 are bent at right angles as shown so as to be retained in position. Various methods and means can be used in conjunction with these wires 24 to attach the mat 20 to a sheet or block of backing type insulation 28 (see FIGS. 5 and 6); for example, a plurality of hairpin-type devices 30 can be placed over the wires 24 at various positions along their length so as to project down below the cold face 26 of the mat 20. Actually, these pins 30 will be driven into the block of backing type insulation 28 and, preferably, these hairpin devices 30 will be of the self-clenching type when they are urged against a hard surface as will appear hereinafter.

Although the mat shown in FIGS. 1 and 2 (and the resulting insulating member comprised thereof) is represented as having a width of approximately one foot and a length of possibly several feet, the preferred shape is shown in FIGS. 4 to 7. The resulting insulating member shown in these figures would have a nominal 12 inch by 12 inch face size and a 2300° F temperature rating. The actual face size will be 12¼ inches × 12¼ inches, the additional ¼ inches insuring fullness in the installed insulation while providing a net twelve inch by twelve inch coverage. Intermediate strips 22' and the outer strips 34 (later to be described) are cut to their respective sizes from one inch thick ceramic fiber blanket. The block of insulation 28 is mineral block insulation which, in this case, is cut to a size two inches thick, ten inches wide and twelve inches long. Since the outer strips 34 overlie the longitudinal side edges of the block 28, these strips would be two inches longer (in the vertical direction as they appear in FIG. 7) than the intermediate strips 22'. It might also be mentioned that a hole 36 is drilled in the center of the block 28 so as to receive a stud (later to be described).

Figure 4:
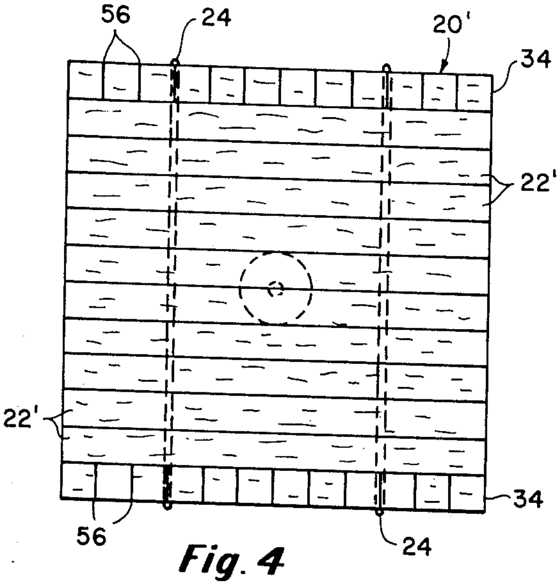
FIG. 4 is a plan view of another embodiment of a ceramic fiber mat made in accordance with the present invention.
Figure 5:
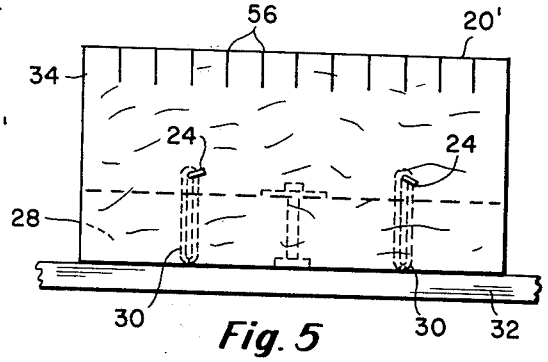
FIG. 5 is a side elevation of the ceramic fiber mat shown in FIG. 4 with certain internal connecting members shown in dotted lines and further showing the association of the resulting insulating member wih a furnace wall.

Parts 34 and 22' are now laid side by side to form the hot face and are secured together by means of the stainless steel wires 24 which are bent ninety degrees at the ends to hold them in place. As shown in FIGS. 4 and 5, two such wires 24 are provided for the insulating member shown in these figures, although additional number of wires could be provided if desired.

The nxt step in the assembly of the insulating member involves the installation of the stud which will now be described. The stud comprises a central shank 38 having nut 40 threadedly mounted at the upper end thereof. A washer 42 is provided on the shank 38 immediately below the nut 40. When installed, the washer 42 will rest against the upper surface of the block 28. The lower end of the shank 38 is provided with a stud tip 44 of relatively smaller cross sectional area. Also mounted on the lower end of the shank 38 are a ring retainer 46 received in the groove 48 and a ring-shaped ceramic arc shield 50 which is secured to the ring 46 by cement or in any other suitable manner. The purposes of the foregoing elements will be described hereinafter in greater detail.

At any event, after the stud (with associated elements attached) is inserted into the hole 36 in the manner described above, the prior assembly of parts 22', 34 and 24 are placed over the block 28 with the lower parts of the side strips 34 overlying the two longitudinal side edges of the block 28. Four hairpin-type stainless steel fasteners 30 (two for each wire 24) are now inserted into the seams between the strips 22' so as to engage the wires 24. These fasteners 30 are driven through and clenched against the back surface of the block 28. By providing a hard surface, preferably steel, below the block 28 when the fasteners 30 are inserted, the lower ends of these fasteners will clench towards each other as shown in FIG. 5. When the tool (not shown) for inserting the fasteners 30 is withdrawn from the seams, the strips 22' will return to their original position without leaving any gap or aperture because of the inherent resiliency of these strips.

Figure 10:
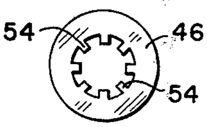
FIG. 10 is an enlargement, on a slightly larger scale, of the retaining ring shown in FIG. 8.

The resulting insulation member, now complete, is ready for installation against a furnace wall 32 by means of a stud welding process which is more fully described and claimed in copending application "Method and Apparatus for Stud Welding" referred to above. The method and apparatus for stud welding (as described in the aforementioned copending application) forms no part of the present invention but is described briefly hereinafter merely to show one manner of attachment of the insulating member 20' to a furnace wall. A stud welding gun 52 is inserted into the central seam between the middle strips 22' until the lower end of the gun engages the nut 40 of the stud. The stud gun is triggered and current flows into the shank 38 and into the tip 44. The tip 44, because of its relatively small cross sectional area burns away and thus starts an arc. The stud shank 38 does not itself move at first because it is supported by the self-locking ring retainer 46 which is retained in the groove 48 as indicated heretofore. As best shown in FIG. 10, the ring retainer 46 is provided with a plurality of radial fingers 54 which project into the recess 48 to hold the ring 46 in position. As the welding operation continues, the intense heat of the arc burns away the fingers 54, thus allowing the stud shank 38 to plunge into the molten metal formed by the arc. At this point, the weld is completed and the gun can be withdrawn. It should be mentioned, however, that the ring retainer 46 and the fingers 54 thereon are carefully sized so that the fingers will burn away, melt, or soften in approximately two tenths of a second, or within whatever period of time is deemed appropriate, all as set forth more fully in the aforementioned copending application.

Now, it may be desirable to tighten the nut 40 on the shank 38. This can be done by merely rotating the gun about the vertical axis of the shank. It might be mentioned that the lower end of the gun (or extension thereof, if desired) is provided with a hexagonal opening corresponding to the size of the nut 40 and of sufficient depth to accommodate for the upper end of the shank 38 after the nut is tightened thereon. Thus the gun 52 serves a secondary function as a wrench for the nut. When the stud gun is withdrawn, the resiliency of the ceramic fiber strips will cause the strips to return to their original position thus concealing and protecting the studs from the severe heat in the furnace.

Returning now to further consideration of FIGS. 4 and 5, it should be noted that the end strips 34 of the insulating member 20′ are preferably provided with a plurality of one inch deep cuts 56 spaced approximately one inch apart from each other so as to relieve possible shrinkage stresses on parts 34 only.

Figure 6:
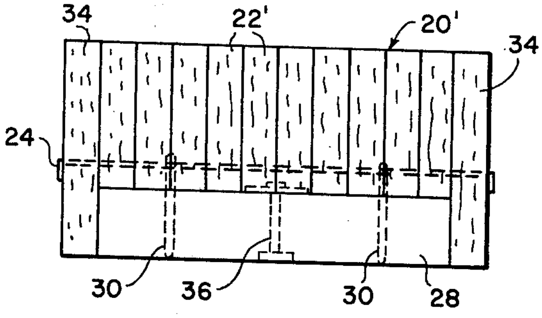
FIG. 6 is an end elevation of the ceramic fiber mat shown in FIG. 5.
Figure 7:
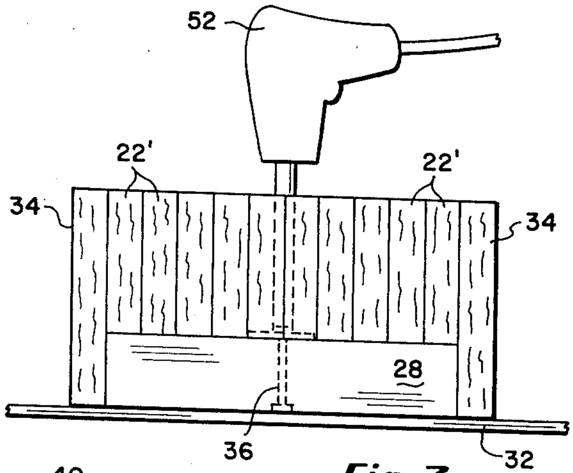
FIG. 7 is a view similar to FIG. 6 showing a method of stud welding of the resulting insulating member to a furnace wall.
Figure 11:
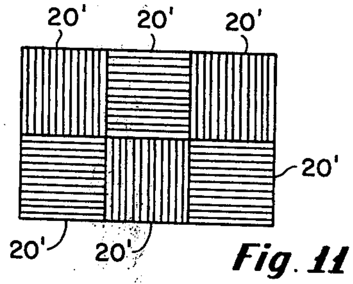
FIG. 11 shows a parquet-type arrangement of insulating members on a furnace wall.
Figure 8:
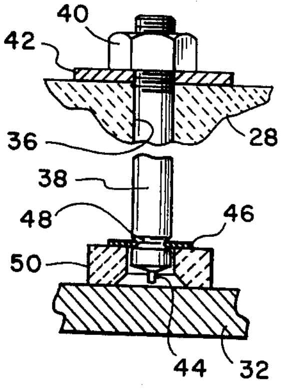
FIG. 8 is an enlarged and fragmentary detail view, with certain parts in cross-section, of the stud, nut and associated structure involved.
Figure 9:
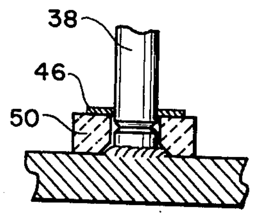
FIG. 9 is a view similar to the lower portion of FIG. 8 showing the relationship of the various parts following the welding operaion.

As shown in FIG. 11, it may be desirable to arrange the blocks 20′ of FIGS. 4 through 6 in such a manner that the strips of adjacent members are at right angles to each other to give a resulting criss-cross appearance similar to that of parquet flooring. As indicated heretofore, the arrangement of the fibers is such that they are oriented essentially in planes which are perpendicular to the furnace wall. This tends to eliminate or minimize the occurance of cracks which result from heat shrinkage of ceramic fibers. The arrangement shown in FIG. 11 tends to minimize or offset lineal shrinkage of the strips themselves.

Figure 12:
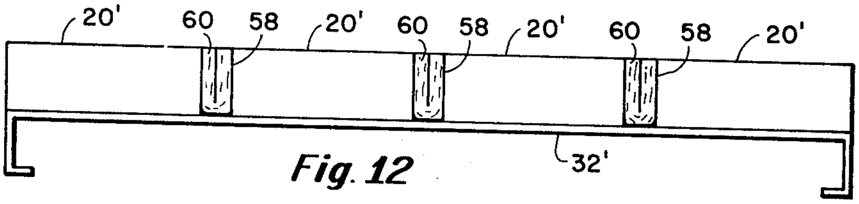
FIG. 12 shows an enlargement of insulating members on a furnace wall with spaces between adjacent members being filled with separate insulating elements.
Figure 13:
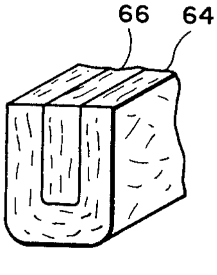
FIG. 13 shows one embodiment of a separate insulating element to be inserted between adjacent insulating members.
Figure 14:
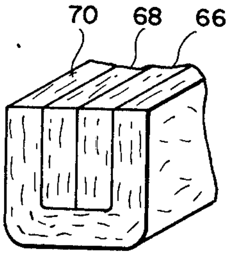
FIG. 14 is another embodiment of a separate insulating element to be inserted between adjacent insulating members.
Figure 15:
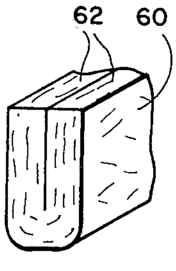
FIG. 15 is still another embodiment of a separate insulating element to be inserted between adjacent insulating members.

The method and apparaus for insulating a furnace wall must be adaptable to walls which do not correspond, dimensionally, to the usage of nominal twelve inch by twelve inch insulating members. Also, it is recognized that the method and apparatus for insulating a furnace should be adaptable to furnaces which have irregularly shaped burner blocks and flue openings. As shown in FIG. 12, it is possible to arrange and attach a plurality of insulating members 20′ to the surface 32′ of a furnace not readily adaptable for the close end-to-end, side-to-side, arrangement shown in FIG. 11. In the case of FIG. 12, spaces 58 are provided between adjacent insulating members 20′ in longitudinal or transverse or both, directions, depending upon the dimensional limitations of the furnace. The resulting spaces 58 can now be filled with specially folded ceramic fiber blankets such as shown in FIGS. 13, 14 and 15. The three fillers shown in the latter three figures are constructed in substantially the same way as the strips 22; that is, they are cut from a one inch thickness of four pound density ceramic fiber blanket and folded over.

In FIG. 15, there would be a single sheet 60 which is folded once so that its upper edges 62 provide the same type of end or edge fiber exposure referred to herein. If the resulting space is larger than two inches wide, then it is possible to go to the configuration shown in FIG. 13 which is comprised of two strips 64 and 66, which are cut in the same manner described above. The central strip 66 is relatively narrow in a vertical direction and the outer strip 64 is sufficiently wide that it can be folded around the central strip 66 as shown, the upper surfaces of strips 64 and 66 both providing the end or edge fiber arrangement referred to above.

Again, if the resulting space between adjacent insulating members 20 or between an insulating member 20 and a duct, etc. is greater than three inches, then it might be desirable to use the configuration shown in FIG. 14 where an additional central strip 68 is provided. This strip 68 will lie adjacent the strip 66 and an outer strip 70, slightly greater in width than the strip 64 will be folded over the central strips 66 and 68 to provide the arrangement shown.

The different embodiments shown in FIGS. 13, 14 and 15 can be held in place by ceramic cement, stainless steel wire or by the friction between the fibers alone.

FURTHER EMBODIMENTS AND MODIFICATIONS

Whereas the method of assembling the mat as described in relation to FIGS. 1 to 3 has been set forth in terms of wires 24, fasteners 30, etc. it should be understood that other methods could be employed to hold the strips together and to attach them to the backing insulation block. For example, the ceramic fiber strips could be attached to each other by means of suitable ceramic cements or mortar materials which are preferably utilized in the area adjacent the cold face of the fiber mat. Also, although the mats have been shown as being connected to a backing insulation block prior to application to a furnace wall, the mats could be applied directly to the furnace wall.

As far as the manner of fastening is concerned, the foregoing disclosure indicates that the mat of FIG. 1 or the composite block of FIG. 4 can be attached to a furnace wall by means of mortar, ceramic cement or various metallic fasteners. Since the ceramic cement or mortar will generally be located adjacent the cold face of the insulating member, there should be no particular high temperature problem as far as the cement or mortar is concerned; however, where metallic fasteners are concerned, it is generally recognized that alloy pins, bolts, washers and screws which could be used as fasteners have a maximum temperature limit in the range of 2000° 2100° F. "burying" or imbedding the fastener in the insulating member at a position spaced from the hot face thereof, as disclosed in the present invention, it is possible to use alloy pins, bolts, etc. without, at the same time, exposing these metallic fasteners to such high temperatures as would interfere with their effectiveness.

Although it is indicated that the mat of FIG. 1 could be applied directly to a furnace wall by means of ceramic cement or mortar, it is possible to precondition the cold face of the mat to permit the use of the stud welding method of attachment disclosed herein. For example, if a layer of cement or mortar is imbedded in the mat along the cold face thereof and allowed to harden, it is obvious that the welding technique and fasteners described in connection with FIGS. 7 to 10 could be employed, although a shorter shank 38 obviously would be necessary. The making of such a cement or mortar layer at the cold face of the mat could also be done in connection with the use of a high temperaure cloth or stainless steel wire mesh which would be applied to or imbedded in the mortar layer at the cold face of the mat to improve the fastening capabilities thereof.

Referring now to FIGS. 4 through 7, a suitable insulating block 20′ designed for operation at 1800° F is one where the backing block or mineral block 28 is about two inches in thickness and the strips 22′ are approximately 1 inch in width giving a total width of the block, from the cold face to the hot face thereof, of about 3 inches. A suitable insulating block 20' designed for operation at 2600° F is one where the mineral block 28 is also two inches in thickness but where the strips 22' are four inches in thickness giving an overall dimension of six inches from the cold face to the hot face. By using strips 22 varying in width from 1 inch to 5 inches or more, depending upon the requirements of the particular furnace, it should be apparent that insulating blocks and/or mats could be employed to cover the recommended range of 1600° F to 2800° F.

Although the block 28 has been referred to as a mineral block whose composition and properties are well recognized in the art, it is also possible to use asbestos block or calcium silicate block, these blocks being relatively rigid, especially as compared to the fiber mat or strips, so as to provide relatively rigid backing material for the mat. The strips 22 or 22' of the ceramic fiber mat 20 or 20', respectively, are preferably cut from a ceramic fiber blanket having a density of 4 pounds per cubic foot. It is understood that the manufacturers provide ceramic fiber blankets which are available in densities ranging generally from 3 to 14 pounds per cubic foot. In the specific examples referred to herein, the ceramic fiber material has a density of four pounds per cubic foot. However, it should be understood that there might be portions of the furnace where the lining would be subject to gas currents which would give rise to erosion problems and, also, that the furnace might have various access openings which would require a lining of greater physical strength or density upon or surrounding the openings; in either of the latter two cases it might be desirable to use a ceramic fiber material of a higher density in the available range referred to above.

Naturally, it is desirable to insulate a furnace wall in such a manner that the outside (cold face) of the furnace is at a minimum temperature. However, it is recognized that this minimum temperature will be dependent upon a number of different factors including, but not limited to, the type, thickness and strength of the outside furnace wall; and prevailing air currents outside of the furnace wall. The use of the present invention will provide an outside temperature varying between 200° F and 350° F which is considered to be an acceptable range.

The preferred embodiment of the present invention, as disclosed above, describes the high-temperature insulating fibers which constitute the mat as "ceramic" fibers. However, this invention sould not be tied down to any precise definition of "ceramic"; any high temperature insulating fiber which possesses properties similar to the ceramic fibers indicated herein and capable of operating above 1600° F could be used in conjunction with the present invention and should be considered as falling within the scope thereof.

Whereas the present invention has been described in particular relation to the drawings attached hereto, it should be understood that other and further modifications apart from those shown or suggested herein may be made within the spirit and scope of this invention.

What is claimed is:

1. A method of protecting the inside wall of a furnace, comprising:

constructing a plurality of insulating blocks, with each of said blocks having a flat side adapted for attachment to the inside wall of a furnace and being comprised of side-by-side srips of material composed of insulating fibers, the fibers having no particular orientation but forming a plurality of planes substantially parallel to each other and generally perpendicular to said flat side of said blocks; and attaching each of said blocks to said furnace wall.

2. The method claimed in claim 1, wherein said attaching is carried out by passing a metal attaching member between said strips and through said flat side of each of said blocks and connecting one end of said attaching member to said wall.

3. The method claimed in claim 2, wherein said attaching members are attached to said wall by an internal welding operation.

4. A method of providing internal insulation for a furnace wall comprising the steps of:

providing a plurality of strips of insulating material, each strip being formed from a plurality of generally parallel planes of randomly oriented fibers;

positioning the strips to orient the parallel planes substantially perpendicular to the furnace wall; and attaching the strips to the furnace wall.

5. The method of internal insulation as recited in clam 4 wherein the insulating fibers are ceramic fibers.

6. A method of providng internal insulation as recited in claim 4, wherein the strips are attached to the furnace wall by means of metallic fasteners inserted transversely through said strips, said metallic fasteners being affixed to the furnace wall.

7. The method of insulating as described in clam 6, wherein the metallic fastener is attached to the furnace wall by an internal welding operation.

8. A method of insulating the interior of a furnace wall, comprising:

constructing a plurality of flat insulating blocks, each of said blocks having a flat side and being comprised of side-by-side strips of ceramic fibers having a generally random orientation, the fibers forming a plurality of planes substantially parallel to each other and generally perpendicular to said flat side of said blocks, an further including means for holding said strips adjacent each other and a fastener embedded in said block; and attaching each of said blocks to the furnace wall with the flat side adjacent the wall, said attaching being carried out by connecting the internal fastener to the furnace wall.

9. The method of claim 8 wherein said strips of fibers are folded so that their outer edges comprise planes of fibers substantially parallel to each other and generally perpendicular to the furnace wall.

* * * * *